May 19, 1931. H. B. DONLEY 1,805,813

OIL MEASURE

Filed June 18, 1929

Inventor

H. B. Donley

By W. D. McDowell

Attorney

Patented May 19, 1931

1,805,813

UNITED STATES PATENT OFFICE

HAROLD B. DONLEY, OF COLUMBUS, OHIO, ASSIGNOR TO THE COLUMBUS AUTO BRASS COMPANY, OF COLUMBUS, OHIO, A CORPORATION OF OHIO

OIL MEASURE

Application filed June 18, 1929. Serial No. 371,872.

This invention relates to improvements in liquid measures and refers particularly to that class of measures commonly employed by garages, automobile service stations and the like for the purpose of measuring, selling and dispensing internal combustion engine lubricants.

It is the primary object of this invention to provide a liquid measure having a bottom embodying improved features of construction for insuring the complete and speedy drainage of the liquid from the measure when the contents are discharged therefrom in the ordinary manner.

With these and other objects in view as will appear as the description proceeds, the invention consists in the novel features of construction, combination of elements and arrangement of parts hereinafter to be fully described and pointed out in the appended claim.

Figure 1:
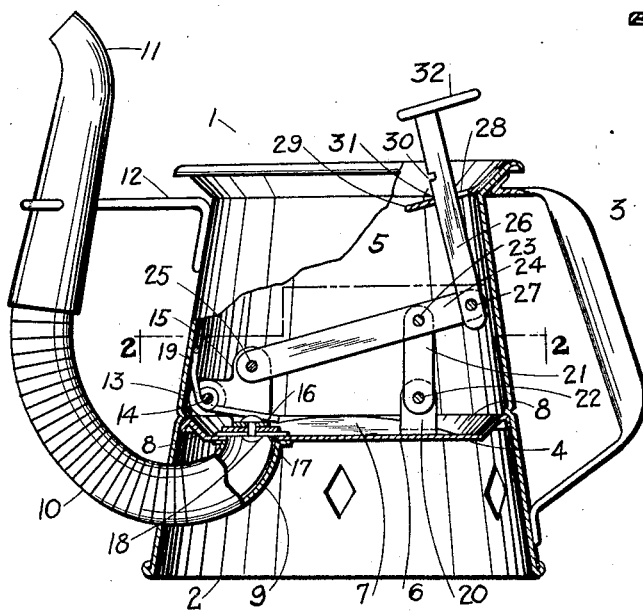
Figure 3:
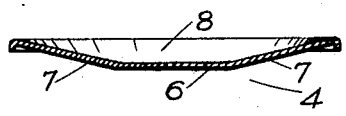
Figure 2:
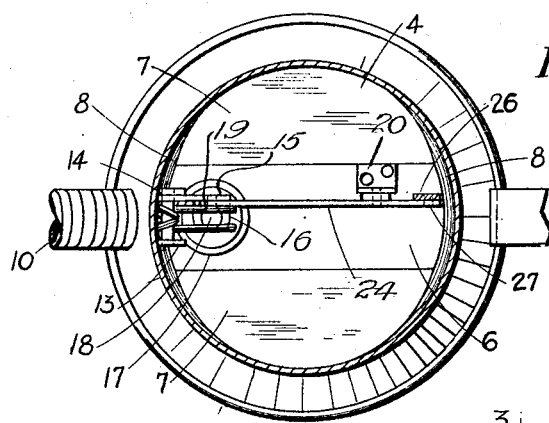
Figure 4:
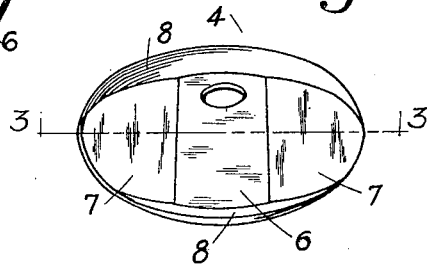
Figure 5:
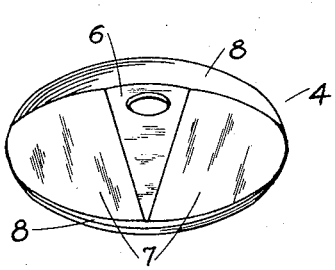

In the accompanying drawings:

Figure 1 is a vertical sectional view taken through a liquid measure constructed in accordance with the features of the present invention, Figure 2 is a horizontal sectional view taken on the plane indicated by the line 2—2 of Figure 1, Figure 3 is a vertical sectional view taken on the line 3—3 of Figure 4, Figure 4 is a perspective view of the improved bottom member comprising the present invention, Figure 5 is a perspective view of the bottom member comprising this invention in a modified form.

Referring more particularly to the drawings, the numeral 1 designates the improved liquid measure comprising the present invention. The measure is formed to comprise a sheet metal casing or body 2 generally of frusto-conical formation. Externally the body 2 is provided with a suitable gripping handle 3 by means of which the measure may be manipulated. Within the body 2 the measure is provided with a substantially horizontal extending bottom wall 4, above which is disposed the liquid receiving and measuring chamber 5 of the device. Any suitable method may be employed for holding the wall 4 in its operative position. In this instance the peripheral edge of the wall 4 is flanged to snugly engage with the conical inner wall of the body 2. The flange may be welded to retain the wall 4 in a secured position.

The wall 4 which forms the bottom of the measuring chamber 5 is depressed or bulged downwardly so as to produce a diametrically extending flat portion or channel 6 at one end of which and near the periphery of the bottom wall is formed an opening for the discharge of the liquid. In its preferred form the channel or level portion is constructed as shown in Figure 4 and is positioned below the plane of the exterior rim of the wall 4. On either side of the level portion or channel 6 the lateral portions 7 of the bottom wall slope downwardly from the rim of the wall 4 to the plane of the channel 6. At either end of the channel 6 the portions 8 of the wall 4 extend upwardly at an acute angle to meet the rim so that the channel 6 extends through nearly the whole diameter of the wall 4.

Situated within the discharge opening is an elbow member 9 which is disposed below the bottom wall 4 and is connected with a tubular and metallic conduit 10. The latter carries at its outer end a fixed nozzle 11 which is normally engaged with a stationary hook 12, stationarily carried by the body 2 as shown in Figure 1.

Controlling the outlet of the opening in the bottom of wall 4 is a valve mechanism which in this instance comprises a substantially U shaped bracket 13. Fixed to the bottom wall 4 the spaced legs of the bracket are provided with registering apertures for the reception of a transversely extending cotter pin 14. The latter pivotally carries a substantially L shaped arm 15, which has its outer portion provided with an offset lug or foot 16. Cooperative with the lug or foot 16 and carried thereby is a valve disk assembly consisting of flat horizontally extending washers between which is positioned a valve disk 17. The washers and valve disk are provided with registering openings, axially positioned to register with a similar opening formed in the lug 16. This opening is adapted to receive a rivet or the like 18 so that the valve disk assembly will be unitarily related with the arm 15 and the disk assembly will swing in unison with the arm 15 above the horizontal axis of the cotter pin 14.

Surrounding the cotter pin 14 and positioned within the bracket 13 are the central convolutions of a wire spring 19. One end of the spring bears on the disk assembly 17 to hold the latter in a seated position normally closing the outlet in the bottom 4, while the other end of said spring rests upon and engages with the inner wall of the body 2 in order to permit said spring to exert proper action in maintaining the valve disk in its said position.

To elevate the disk assembly so as to permit of the outflow of the liquid from the measuring chamber 5, there is mounted on the wall 4, in spaced relation from the bracket 13, a second bracket 20. The latter bracket carries a link 21, one end of which is pivotally connected as at 22 to the bracket 20 and its other end pivotally connected as at 23 to the intermediate portion of a bar 24, the link 21 serving as a floating pivot for said bar. One end of the bar is pivotally connected as at 25 to the arm 15, while the other end of said bar is positioned within the bifurcated lower end of an operating stem 26, a cotter pin 27 passing through the lower end of the stem and the bar 24 pivotally uniting these elements.

The stem 26 projects angularly and upwardly and is loosely receivable within an opening 28 formed in a stationary lip 29 carried by the upper and inner portion of the body 2. The stem is formed with a groove or recess 30 which provides shoulders. These shoulders or grooves and recesses of the stem are receivable within a slot 31 provided in connection with the opening 28 in the lip 29. By this construction the valve assembly may be conveniently released from its locked position for actuation by the upper thumb engaging end 32 of the stem 26. The thumb engaging portion is situated adjacent to the handle 3 so that the operator may with practically one operation open the valve assembly to permit the outflow of the liquid, or by locating the stem through the means disclosed, the valve assembly may be retained in its open position.

In view of the foregoing it will be seen that the present invention provides a liquid measure which is particularly adapted for use in garages and other automobile service stations in dispensing lubricating oil for internal combustion engines. The outstanding feature of this measure resides in the formation and configuration of the bottom wall of the measuring chamber. In dispensing liquids, particularly lubricating oils for internal combustion engines, with measures of this character it is highly important that the liquid or oil be completely and speedily emptied from the measure. It is the common practice to hold measures of this character level when filled with liquid or oil. It has been found to be the uniform custom to tilt the measure slightly as the contents are discharged from the measure so that when the contents are nearly completely discharged that portion of the bottom of the measure in which the discharge opening is situated is held slightly lower than the opposite edge of the bottom. It will be observed that in the present invention the liquid or oil adhering to the sides of the measure flows downwardly striking the inclined portions of the bottom wall and is caused to flow directly into the channel. This residue of oil or liquid meeting in the channel forms a stream of oil or liquid which moves toward the opening at one end of the channel, since the edge near which the opening is situated is normally held slightly lower. By diverting the residual liquids as quickly as possible into the stream from which faster movement is obtained the contents of the measure are entirely emptied in the shortest time. This is in contrast with prior constructions wherein no defined channel for the movement of the remaining oil or liquid is provided and where the remaining liquid moves slowly across the whole area of the bottom without any defined stream of liquid being formed.

What is claimed is:

In a liquid measure, a body, a wall disposed within said body and serving to define the bottom of a liquid measuring chamber, said bottom being formed to include a diametrically extending level portion having a discharge opening at one end thereof, inclined portions sloping toward said level portion and a valve for opening and closing said discharge opening.

In testimony whereof I affix my signature.

HAROLD B. DONLEY.